US011964750B2

(12) United States Patent
Zakucia et al.

(10) Patent No.: US 11,964,750 B2
(45) Date of Patent: Apr. 23, 2024

(54) PROPELLER SPEED OVERSHOOT PREVENTING LOGIC

(71) Applicant: General Electric Company, Schenectady, NY (US)

(72) Inventors: Jozef Zakucia, Prague (CZ); Vojtech Jirasek, Prague (CZ); Milan Matejka, Prague (CZ)

(73) Assignee: General Electric Company, Schenectady, NY (US)

( * ) Notice: Subject to any disclaimer, the term of this patent is extended or adjusted under 35 U.S.C. 154(b) by 137 days.

(21) Appl. No.: 16/295,433

(22) Filed: Mar. 7, 2019

(65) Prior Publication Data

US 2020/0283124 A1 Sep. 10, 2020

(51) Int. Cl.
*B64C 11/30* (2006.01)
*B64C 11/40* (2006.01)
*B64C 11/42* (2006.01)
*B64C 11/44* (2006.01)

(52) U.S. Cl.
CPC .......... *B64C 11/305* (2013.01); *B64C 11/303* (2013.01); *B64C 11/40* (2013.01); *B64C 11/42* (2013.01); *B64C 11/44* (2013.01)

(58) Field of Classification Search
CPC ... B64C 11/303; B64C 11/305; B64C 11/325; B64C 11/346; B64C 11/385; B64C 11/40; B64C 11/42; B64C 11/44; B64C 11/38
See application file for complete search history.

(56) References Cited

U.S. PATENT DOCUMENTS

| | | | |
|---|---|---|---|
| 3,107,881 A | 10/1963 | Stuart, III | |
| 4,958,289 A | 9/1990 | Sum et al. | |
| 5,331,559 A | 7/1994 | High et al. | |
| 6,637,202 B2 * | 10/2003 | Koch | B64C 11/305 60/602 |

(Continued)

FOREIGN PATENT DOCUMENTS

| | | | | |
|---|---|---|---|---|
| CA | 2736193 A1 * | 3/2010 | ........... | B64C 11/305 |
| EP | 3093234 A1 | 11/2016 | | |

(Continued)

OTHER PUBLICATIONS

European Search Report Corresponding to Application No. 20160986 dated Jul. 21, 2020.

*Primary Examiner* — Christopher Verdier
(74) *Attorney, Agent, or Firm* — Dority & Manning, P.A.

(57) ABSTRACT

A control system for an engine operatively coupled with a propeller and methods for controlling an engine operatively coupled with a propeller are provided. In one example aspect, the control system includes a controller and an electric propeller governor. The electric propeller governor includes a motor operatively coupled with a flyweight governor spring. The motor is communicatively coupled with the controller. The controller is operable to receive data indicative of the speed of the propeller, determine if the measured speed exceeds a propeller speed threshold, and if the threshold is exceeded, the controller is configured to change a propeller speed set point. Particularly, the controller can cause the motor to change the preload on the flyweight governor spring, which in turn causes adjustment of the propeller speed set point. In this way, propeller speed overshoot is prevented during fast acceleration of the engine.

17 Claims, 8 Drawing Sheets

(56) References Cited

U.S. PATENT DOCUMENTS

| | | | |
|---|---|---|---|
| 6,672,835 | B1 | 1/2004 | Hughes |
| 6,885,917 | B2 | 4/2005 | Osder et al. |
| 8,113,460 | B2 | 2/2012 | Roesch |
| 8,651,811 | B2 | 2/2014 | Danielson |
| 9,475,572 | B2 | 10/2016 | Collingbourne |
| 9,745,051 | B2 | 8/2017 | Tantot et al. |
| 10,040,565 | B2 | 8/2018 | Looper et al. |
| 10,487,682 | B2 | 11/2019 | Duke et al. |
| 2008/0254948 | A1 | 10/2008 | Chen |
| 2013/0323050 | A1* | 12/2013 | Kleckler ............... B64C 11/385 |
| | | | 416/1 |
| 2015/0314853 | A1* | 11/2015 | Tantot ................... B64C 11/305 |
| | | | 701/3 |
| 2018/0126848 | A1 | 5/2018 | Goossens et al. |
| 2019/0031319 | A1 | 1/2019 | Calkins et al. |

FOREIGN PATENT DOCUMENTS

| | | |
|---|---|---|
| EP | 3434585 A1 | 1/2019 |
| GB | 683906 A | 12/1952 |

\* cited by examiner

PROPELLER SPEED OVERSHOOT PREVENTING LOGIC

FIELD

The subject matter of the present disclosure is related generally to a control system for an engine operatively coupled with a propeller, and more particularly to a control system for preventing propeller speed overshoot of a propeller operatively coupled with an engine.

BACKGROUND

Some aerial vehicles include a turboprop engine operatively coupled with a propeller for producing thrust. In some instances, fast acceleration of the turboprop engine can cause the speed of the propeller to overshoot the maximum propeller speed that can be demanded by a pilot, or the maximum demanded propeller speed. For instance, the propeller speed can overshoot the maximum demanded propeller speed during takeoff when the turboprop engine accelerates from an idle engine setting to a take-off power setting. In some cases, the propeller speed can overshoot the maximum demanded propeller speed such that the actual propeller speed reaches or nearly reaches a propeller speed maximum limit. There is typically safety margin between the propeller speed maximum limit and the maximum demanded propeller speed, and when the propeller speed overshoots the maximum demanded propeller speed, the margin can be breached to an unsatisfactory degree. Propeller speed overshoot can negatively affect the turboprop engine and/or propeller life and can limit the number of propellers that can be used with the turboprop engine as propeller speed overshoot can be a limiting factor during propeller selection. Propeller speed overshoot can have other drawbacks as well.

Therefore, there is a need for an improved control system for an engine operatively coupled with a propeller and methods for controlling the same that address one or more of the challenges noted above.

BRIEF DESCRIPTION

Aspects and advantages of the invention will be set forth in part in the following description, or may be obvious from the description, or may be learned through practice of the invention.

In one example aspect, the present subject matter is directed to a control system for an engine operatively coupled with a propeller. The control system includes an electric propeller governor having a motor and a flyweight governor spring mechanically coupled with the motor. Further, the control system includes a sensor operable to sense a propeller speed of the propeller. Further, the control system includes one or more control devices communicatively coupled with the motor of the propeller governor and the sensor. The one more control devices are configured to: receive, from the sensor, data indicative of the propeller speed of the propeller; determine whether the propeller speed exceeds a propeller speed threshold; and cause the motor of the electric propeller governor to change a preload on the flyweight governor spring based at least in part on whether the propeller speed exceeds the propeller speed threshold, wherein change of the preload on the flyweight governor spring adjusts a propeller speed set point of the propeller.

In another example aspect, the present subject matter is directed to a method for controlling an engine operatively coupled with a propeller. The method includes receiving, by one or more control devices, data indicative of a propeller speed of the propeller. Further, the method includes determining, by the one or more control devices, whether the propeller speed exceeds a propeller speed threshold. Moreover, the method includes adjusting a propeller speed set point to change the propeller speed of the propeller based at least in part on whether the propeller speed exceeds the propeller speed threshold.

In another example aspect, the present subject matter is directed to a vehicle. The vehicle includes a gas turbine engine and a propeller operatively coupled with the gas turbine engine. The vehicle also includes a control system. The control system includes a sensor and a controller communicatively coupled with the sensor. The controller is configured to: receive, from the sensor, data indicative of the propeller speed of the propeller; determine whether the propeller speed exceeds a propeller speed threshold; and cause adjustment of a propeller speed set point to change the propeller speed of the propeller based at least in part on whether the propeller speed exceeds the propeller speed threshold.

In yet another example aspect, a control system for a drive element operatively coupled with a rotating element is provided. The drive element can drive the rotating element about an axis of rotation. The drive element can be operatively coupled with the rotating element in any suitable manner, such as e.g., by one or more shafts or other mechanical linking members. The driving element can be an electric motor, an engine, a turbine, or some other suitable element for generating useful rotational work. The rotational element can be any suitable rotating element, such as e.g., a propeller, an impeller, blades of a wind turbine, vanes, etc. The control system includes a governor having a motor. Further, the control system includes a sensor operable to sense a rotational speed of the rotating element. Further, the control system includes one or more control devices communicatively coupled with the motor of the governor and the sensor. The one more control devices are configured to: receive, from the sensor, data indicative of the rotational speed of the rotating element; determine whether the rotational speed exceeds a rotational speed threshold; and cause the motor of the governor to adjust the rotational speed of the rotational element if the sensed rotational speed exceeds the rotational speed threshold.

In another example aspect, the present subject matter is directed to a method for controlling a system having a driving element operatively coupled with a rotating element. The method includes receiving, by one or more control devices, data indicative of a rotational speed of the rotating element. Further, the method includes determining, by the one or more control devices, whether the rotational speed exceeds a rotational speed threshold. Moreover, the method includes adjusting a rotational speed set point to change the rotational speed of the rotating element based at least in part on whether the rotational speed exceeds the rotational speed threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
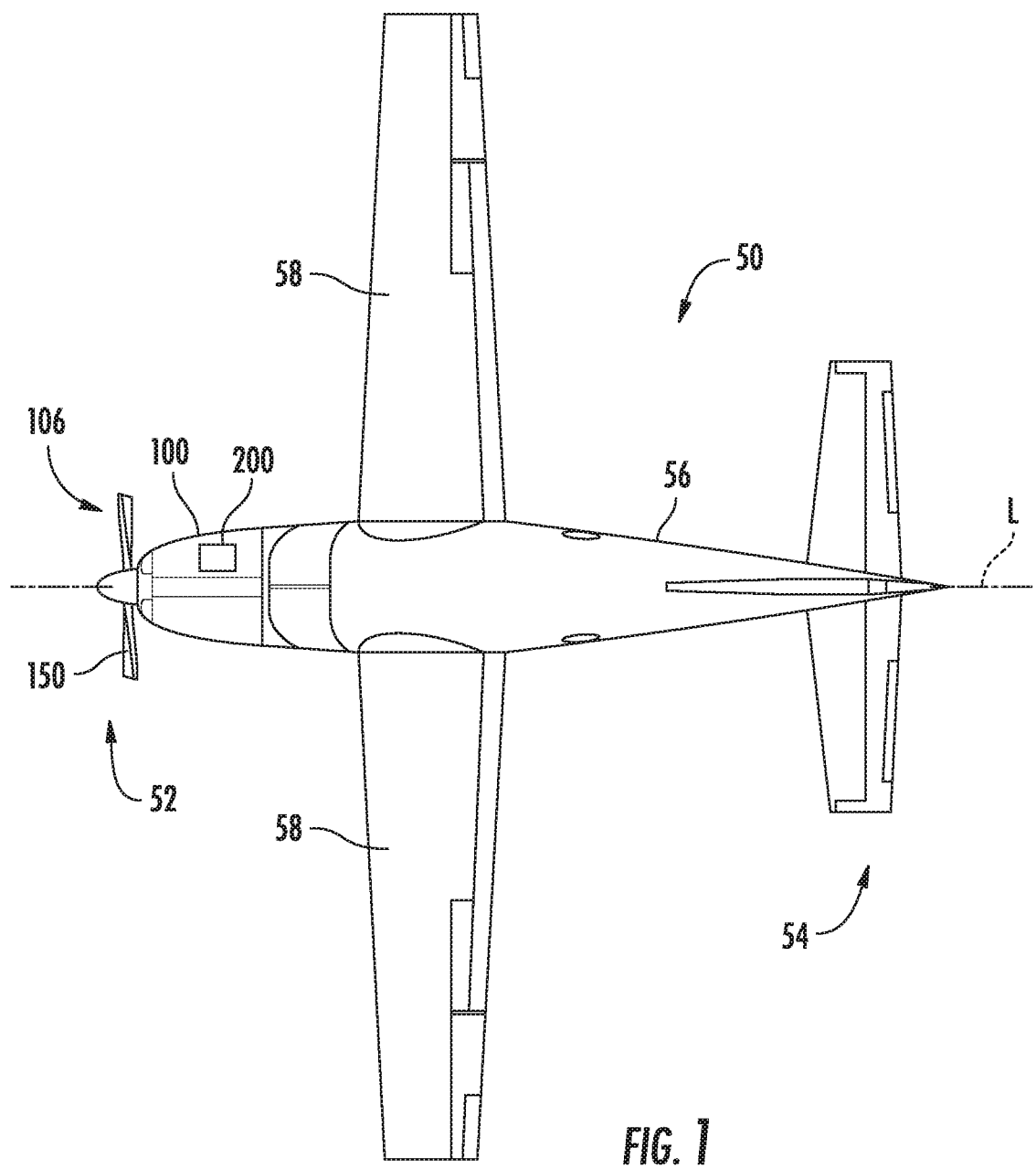
FIG. 1 provides a schematic top plan view of a vehicle according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "aft" or "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis (or centerline) of the engine and an outer engine circumference. Radially inward is toward the longitudinal axis and radially outward is away from the longitudinal axis.

The subject matter of the present disclosure is directed generally to a control system for an engine operatively coupled with a propeller, and more particularly, to a control system for preventing propeller speed overshoot of a propeller operatively coupled with an engine. In one example aspect, the control system includes an electronic engine controller and an electric propeller governor. The electric propeller governor includes opposing flyweights operatively coupled with a pilot valve and a flyweight governor spring. Notably, the electric propeller governor includes a motor operatively coupled with the flyweight governor spring. The motor is communicatively coupled with the engine controller. The engine controller is operable to receive data indicative of the speed of the propeller, determine if the measured speed exceeds a propeller speed threshold, and if the threshold is exceeded, the engine controller is configured to change a propeller speed set point. Particularly, the engine controller can cause the motor to change the preload on the flyweight governor spring, which in turn causes adjustment of the propeller speed set point. For example, the propeller speed set point can be adjusted from a minimum demanded propeller speed or set point (Np Min) to a maximum demanded propeller speed or set point (Np Max) when the engine and propeller rapidly accelerate and the propeller speed exceeds the threshold. In this way, the speed of the propeller is prevented from overshooting the demanded propeller speed and is prevented from reaching or obtaining the maximum propeller speed limit (Np Max Limit). Accordingly, the engine and propeller are not subject to the negative impacts associated with propeller speed overshoot. A method for controlling an engine operatively coupled with a propeller is also provided.

FIG. 1 provides a schematic top plan view of a vehicle according to an example embodiment of the present subject matter. For this embodiment, the vehicle is a fixed-wing aerial vehicle 50. In alternative embodiments, the aerial vehicle 50 can be other suitable types of aerial vehicles, such as a rotary aircraft, a vertical take-off and landing aircraft, a tiltrotor aircraft, an airship, an unmanned aerial vehicle, etc. Further, in some embodiments, the vehicle can be other types of vehicles having an engine and a propeller operatively coupled thereto, such as e.g., a marine vehicle or watercraft, a hovercraft, etc.

As depicted in FIG. 1, the aerial vehicle 50 extends between a first end 52 and a second end 54, e.g., along a longitudinal axis L. The first end 52 is a forward end of the aerial vehicle 50 and the second end 54 is a rear or aft end of the aerial vehicle 50 in the depicted embodiment of FIG. 1. The aerial vehicle 50 includes a fuselage 56 and a pair of wings 58 each extending laterally outward from the fuselage 56. The aerial vehicle 50 can include various control surfaces for controlling movement of the aerial vehicle 50. Example control surfaces include elevators, rudders, ailerons, spoilers, flaps, slats, air brakes, or trim devices, etc. Various actuators, servo motors, and other devices can be used to manipulate the various control surfaces and variable geometry components of the aerial vehicle 50.

The aerial vehicle 50 includes an engine 100 mounted to its forward end 52. The engine 100 can be any suitable aeromechanical torque source. For instance, the engine 100 can be a gas turbine engine. For the depicted embodiment of FIG. 1, the engine 100 is configured as a turboprop. However, in alternative embodiments, the engine 100 can be other suitable types of engines operatively coupled with a propeller. For instance, in some alternative embodiments, the engine 100 can be a piston-driven engine. Moreover, in some embodiments, the aerial vehicle 50 can include more than one engine. For example, in some embodiments, the aerial vehicle 50 can include at least one turboprop mounted to each wing 58.

Figure 2:
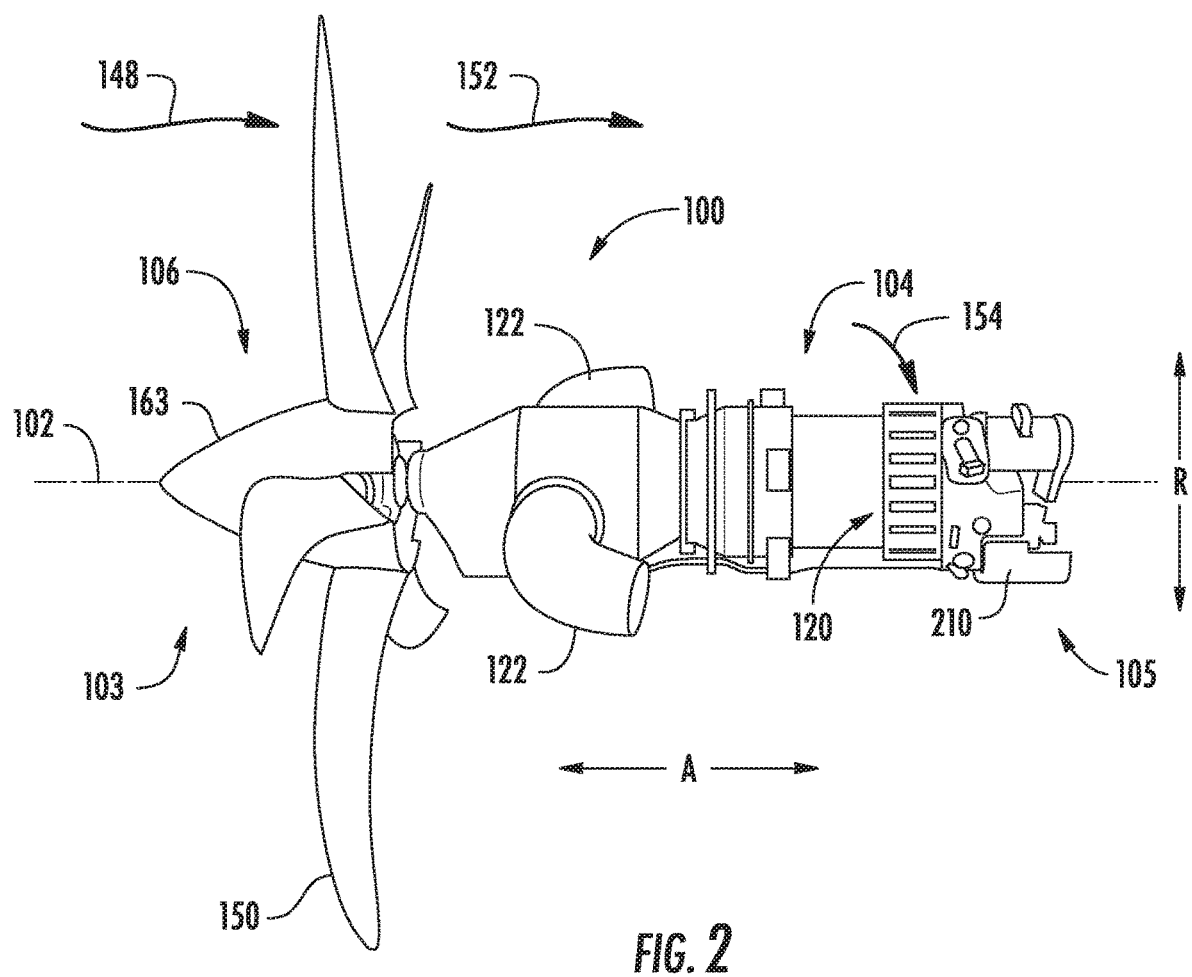
FIG. 2 provides a side view of a gas turbine engine of the vehicle of FIG. 1.
Figure 3:
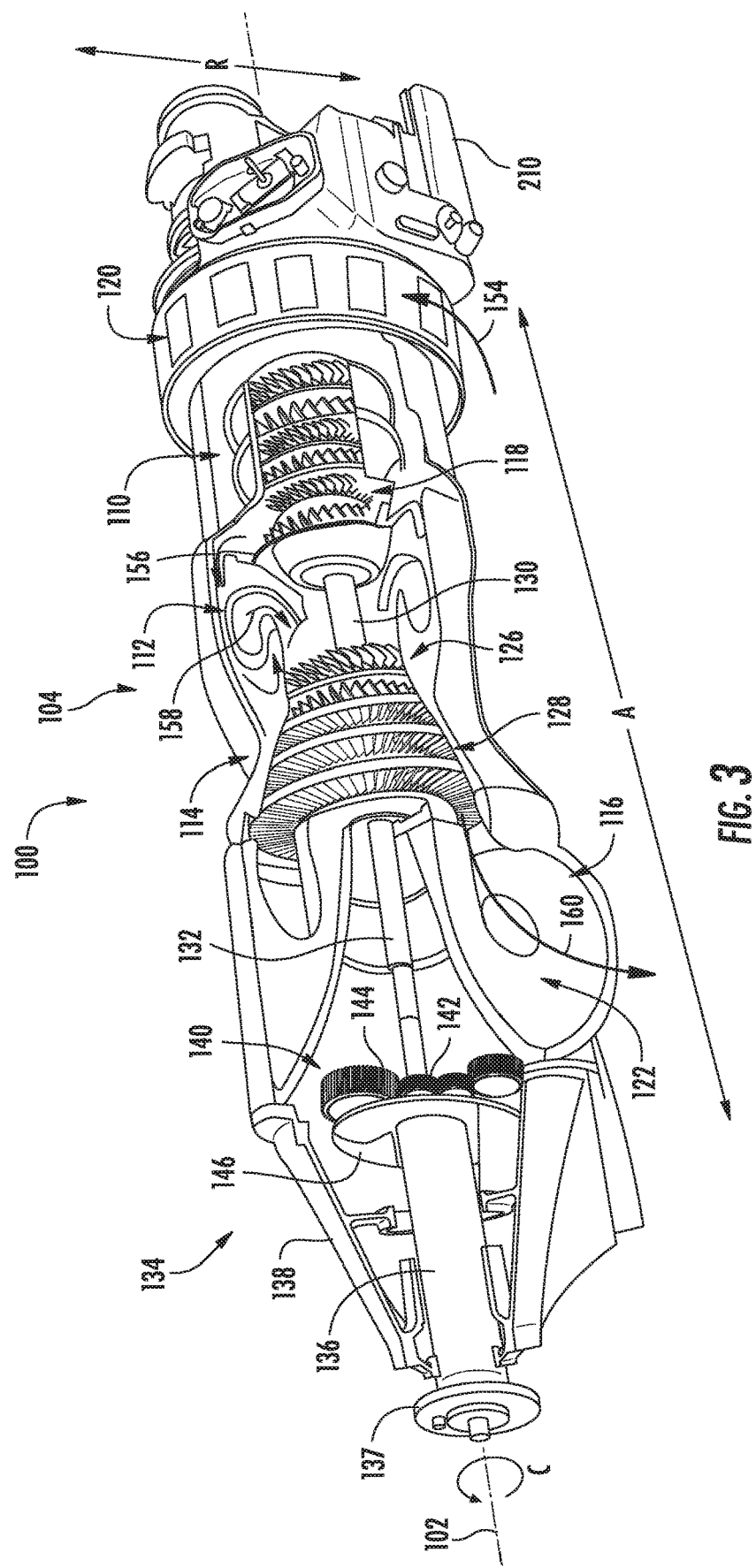
FIG. 3 provides a perspective, cutaway view of the gas turbine engine of FIG. 2.

The aerial vehicle 50 also includes a propeller 106 operatively coupled with the engine 100. For instance, the propeller 106 can be mechanically coupled, e.g., as shown in FIGS. 2 and 3. Generally, the propeller 106 is configured to produce thrust when driven by the engine 100. The propeller 106 includes a plurality of propeller blades 150. In some embodiments, the blades 150 of the propeller 106 are adjustable in unison through a plurality of blade pitch angles, e.g., by activation of an actuation mechanism. Pitch adjustment of the blades 150 can cause the propeller 106 to produce more or less thrust depending on the blade angle of the blades 150.

FIGS. 2 and 3 provide various views of the engine 100 of the aerial vehicle 50 of FIG. 1. Particularly, FIG. 2 provides a side view of the engine 100 and FIG. 3 provides a perspective, cutaway view of the engine 100. For reference, the gas turbine engine 100 defines an axial direction A, a radial direction R, and a circumferential direction C (FIG. 3) extending three hundred sixty degrees (360°) around the axial direction A. The gas turbine engine 100 also defines a longitudinal or axial centerline 102 extending along the axial direction A. The gas turbine engine 100 extends generally along the axial direction A between a first end 103 and a second end 105, which for this embodiment is the forward and aft end, respectively. Generally, the gas turbine engine 100 includes a gas generator or core turbine engine 104 that is operatively coupled with the propeller 106. The propeller 106 and various components of the core turbine engine 104 are rotatable about the axial centerline 102, or more generally, the axial direction A.

As shown best in FIG. 3, the core turbine engine 104 generally includes, in serial flow arrangement, a compressor section 110, a combustion section 112, a turbine section 114, and an exhaust section 116. A core air flowpath 118 extends from an annular inlet 120 to one or more exhaust outlets 122 of the exhaust section 116 such that the compressor section 110, combustion section 112, turbine section 114, and exhaust section 116 are in fluid communication.

The compressor section 110 can include one or more compressors, such as a high pressure compressor (HPC) and a low pressure compressor (LPC). For this embodiment, the compressor section 110 includes a four-stage axial, single centrifugal compressor. In particular, the compressor includes sequential stages of compressor stator vanes and rotor blades (not labeled), as well as an impeller (not labeled) positioned downstream of the axial stages of stator vanes and rotor blades. The combustion section 112 includes a reverse-flow combustor (not labeled) and one or more fuel nozzles (not shown). The turbine section 114 can define one or more turbines, such as a high pressure turbine (HPT) and a low pressure turbine (LPT). For this embodiment, the turbine section 114 includes a two-stage HPT 126 for driving the compressor of the compressor section 110. The HPT 126 includes two sequential stages of stator vanes and turbine blades (not labeled). The turbine section 114 also includes a three-stage free or power turbine 128 that drives a propeller gearbox 134, which in turn drives the propeller assembly 106 (FIG. 2). The exhaust section 116 includes one or more exhaust outlets 122 for routing the combustion products to the ambient air.

Referring still to FIG. 3, the core turbine engine 104 can include one or more shafts. For this embodiment, the gas turbine engine 100 includes a compressor shaft 130 and a free or power shaft 132. The compressor shaft 130 drivingly couples the turbine section 114 with the compressor section 110 to drive the rotational components of the compressor. The power shaft 132 drivingly couples the power turbine 128 to drive a gear train 140 of the propeller gearbox 134, which in turn operatively supplies power and torque to the propeller 106 (FIG. 2) via a torque output or propeller shaft 136 at a reduced RPM. The forward end of the propeller shaft 136 includes a flange 137 that provides a mounting interface for the propeller assembly 106 to be attached to the core turbine engine 104.

The propeller gearbox 134 is enclosed within a gearbox housing 138. For this embodiment, the housing 138 encloses the epicyclical gear train 140 that includes a star gear 142 and a plurality of planet gears 144 disposed about the star gear 142. The planetary gears 144 are configured to revolve around the star gear 142. An annular gear 146 is positioned axially forward of the star and planetary gears 142, 144. As the planetary gears 144 rotate about the star gear 142, torque and power are transmitted to the annular gear 146. As shown, the annular gear 146 is operatively coupled to or otherwise integral with the propeller shaft 136. In some embodiments, the gear train 140 may further include additional planetary gears disposed radially between the plurality of planet gears 144 and the star gear 142 or between the plurality of planet gears 144 and the annular gear 146. In addition, the gear train 140 may further include additional annular gears.

As noted above, the core turbine engine 104 transmits power and torque to the propeller gearbox 134 via the power shaft 132. The power shaft 132 drives the star gear 142, which in turn drives the planetary gears 144 about the star gear 142. The planetary gears 144 in turn drive the annular gear 146, which is operatively coupled with the propeller shaft 136. In this way, the energy extracted from the power turbine 128 supports operation of the propeller shaft 136, and through the power gear train 140, the relatively high RPM of the power shaft 132 is reduced to a more suitable RPM for the propeller 106.

With reference to FIG. 2, during operation of the gas turbine engine 100, a volume of air indicated by arrow 148 passes across the plurality of propeller blades 150 circumferentially spaced apart from one another along the circumferential direction C and disposed about the axial direction A, and more particularly for this embodiment, the axial centerline 102. The propeller assembly 106 includes a spinner 163 aerodynamically contoured to facilitate an airflow through the plurality of propeller blades 150. The spinner 163 is rotatable with the propeller blades 150 about the axial direction A and encloses various components of the propeller assembly 106, such as e.g., the hub, propeller pitch actuator, piston/cylinder actuation mechanisms, etc. A first portion of air indicated by arrow 152 is directed or routed outside of the core turbine engine 104 to provide propulsion. A second portion of air indicated by arrow 154 is directed or routed through the annular inlet 120 of the gas turbine engine 100.

As shown in FIG. 3, the second portion of air 154 enters through the annular inlet 120 and flows downstream to the compressor section 110, which is a forward direction along the axial direction A in this embodiment. The second portion of air 154 is progressively compressed as it flows through the compressor section 110 downstream toward the combustion section 112.

The compressed air indicated by arrow 156 flows into the combustion section 112 where fuel is introduced, mixed with at least a portion of the compressed air 156, and ignited to form combustion gases 158. The combustion gases 158 flow downstream into the turbine section 114, causing rotary members of the turbine section 114 to rotate, which in turn supports operation of respectively coupled rotary members in the compressor section 110 and propeller assembly 106. In particular, the HPT 126 extracts energy from the combustion gases 158, causing the turbine blades to rotate. The rotation of the turbine blades of the HPT 126 causes the compressor shaft 130 to rotate, and as a result, the rotary components of the compressor are rotated about the axial direction A. In a similar fashion, the power turbine 128 extracts energy from the combustion gases 158, which causes the blades of the power turbine 128 to rotate about the axial direction A. The rotation of the turbine blades of the power turbine 128 causes the power shaft 132 to rotate, which in turn drives the power gear train 140 of the propeller gearbox 134.

The propeller gearbox 134 in turn transmits the power provided by the power shaft 132 to the propeller shaft 136 at a reduced RPM and desired amount of torque. The propeller shaft 136 in turn drives the propeller assembly 106 such that the propeller blades 150 rotate about the axial direction A, and more particularly for this embodiment, the axial centerline 102 of the gas turbine engine 100. The exhaust gases, denoted by 160, exit the core turbine engine 104 through the exhaust outlets 122 to the ambient air.

It should be appreciated that the example gas turbine engine 100 described herein is provided by way of example only. For example, in other example embodiments, the engine may include any suitable number or types of compressors, turbines, shafts, stages, etc. Additionally, in some example embodiments, the gas turbine engine may include any suitable type of combustor, and may not include the example reverse-flow combustor depicted. It will further be appreciated that the engine can be configured as any suitable type of engine operatively coupled with a propeller. For instance, in some embodiments, the engine can be configured as a reciprocating or piston engine. In addition, it will be appreciated that the present subject matter can be applied to or employed with any suitable type of propeller or fan configuration, including, for example, tractor and pusher configurations.

Returning to FIG. 1, as shown, the aerial vehicle 50 of FIG. 1 is equipped with an electronic engine control system (EECS) 200. As will be detailed herein, the control system 200 includes propeller speed overshoot preventing logic that, in conjunction with other features of the control system 200, prevent or reduce propeller speed overshoot during fast acceleration or deceleration of the engine 100. For instance, when the engine 100 accelerates from idle to full power during takeoff of the aerial vehicle 50, the control system 200 prevents the speed of the propeller from overshooting the demanded maximum propeller speed. In this way, the life of the engine can be increased or extended. For instance, with use of the control system 200 described herein, propeller speed overshoot was decreased by two percent (2%), and consequently, the life of the engine can be increased by a minimum of fifteen percent (15%). Further, with use of the control system 200 described herein, the safety margin of the engine can be increased, the number of propellers that can be selected for use with the engine can be increased as propeller speed overshoot is typically a limiting factor for selecting a suitable propeller for the engine, a wider range for adjustment of the minimum flight pitch angle can be achieved, and a wider range for adjustment of the maximum propeller speed can be achieved due to the greater margin between the maximum propeller speed and minimum propeller speed, among other benefits and advantages.

Figure 4:
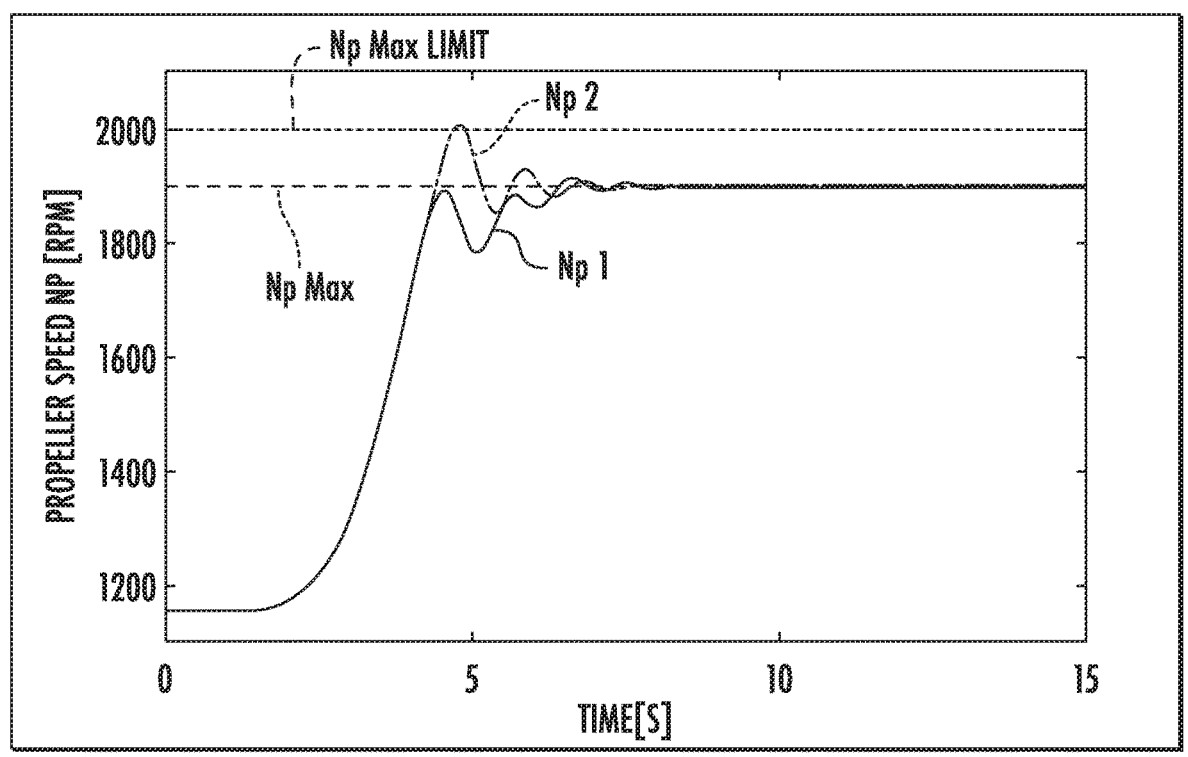
FIG. 4 provides a graph depicting propeller speed of a propeller operatively coupled with an engine versus time according to an example embodiment of the present subject matter.

FIG. 4 graphically depicts the advantages of the control system 200 of the present disclosure. Particularly, the graph of FIG. 4 depicts the propeller speed of a propeller operatively coupled with an engine controlled by the control system 200 of the present disclosure (labeled as Np1) versus time and the propeller speed of a propeller operatively coupled with an engine controlled by a conventional control system (labeled as Np2) versus time. As shown, during fast acceleration of the engine, the propeller speed Np2 of the propeller controlled by the conventional control system (i.e., a control system without overshoot preventing logic) accelerates rapidly from under 1,200 rpm to about 2,000 rpm in about five seconds (5 s). Notably, the propeller speed Np2 overshoots the maximum demanded propeller speed (labeled as Np Max) set at 1,900 rpm and increases to about the propeller speed maximum limit (labeled as Np Max Limit), which is 2,000 rpm in this example (103% of Np Max). The propeller speed Np2 eventually settles within a predetermined range of steady state (e.g., within plus or minus five percent (5%) of a steady state value) at about 1,900 rpm after about ten seconds (10 s). As noted above, overshooting the maximum demanded propeller speed (Np Max) can negatively affect the life of the engine and/or the propeller in a significant way and can limit the selection of propellers available for use with the engine, among other drawbacks. Overshooting the maximum demanded propeller speed (Np Max) and reaching or obtaining the propeller speed maximum limit (Np Max Limit) on the first overshoot as shown in FIG. 4 especially impacts the life cycle of the engine and propeller.

In comparison, during fast acceleration of the engine, the propeller speed Np1 of the propeller controlled by the control system 200 accelerates rapidly from under 1,200 rpm to about 1,900 rpm in about five seconds (5 s). Advantageously, as depicted, during rapid acceleration of the engine, the propeller speed Np1 rapidly accelerates and has a very minimal, if any, overshoot of the maximum demanded propeller speed (Np Max), which is 1900 rpm in this example as noted above. The propeller speed Np1 eventually settles within a predetermined range of steady state (e.g., within plus or minus five percent (5%) of a steady state value) at about 1,900 rpm after about ten seconds (10 s). Accordingly, as the propeller speed Np1 does not or only minimally overshoots the maximum demanded propeller speed (Np Max), the engine and propeller are not negatively impacted in the same manner as the propeller controlled by the conventional control system. The control system 200 that prevents propeller speed overshoot and provides the advantages and benefits described above will be described in detail below.

Figure 5:
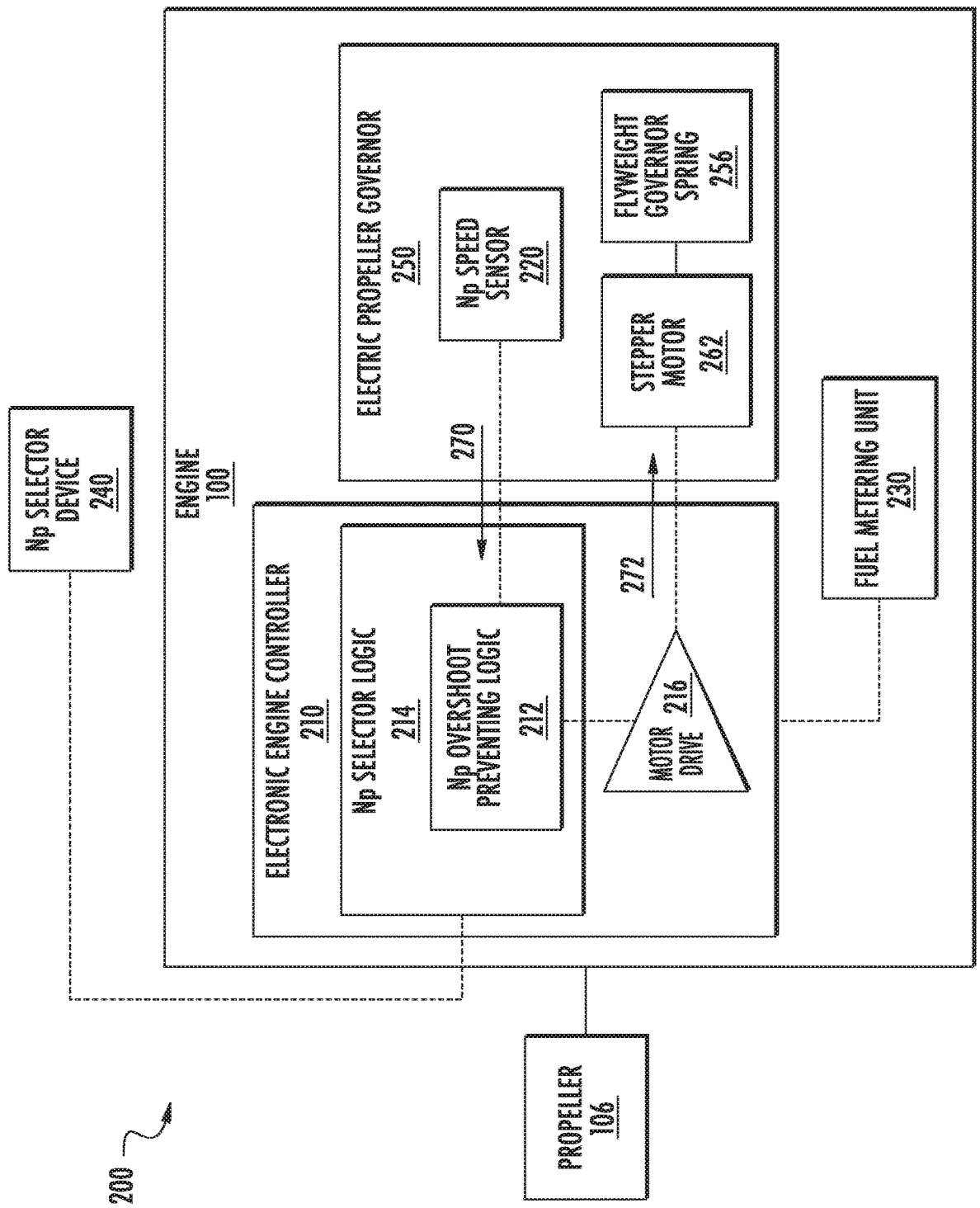
FIG. 5 provides an electronic engine control system according to an example embodiment of the present subject matter.

FIG. 5 provides a schematic view of control system 200 according to an example embodiment of the present subject matter. The control system 200 can be an electronic engine control system (EECS), for example. As shown, the control system 200 can include one or more control devices for controlling the engine 100 and the propeller 106. Particularly, for the depicted embodiment of FIG. 5, the one or more control devices include an electronic engine controller (EEC) 210 configured to control the gas turbine engine 100 and the propeller 106. The controller 210 can operate as the central control unit for the control system 200, which as noted above, can be an EECS. In some embodiments, the controller 210 can be an analog electronic box. In other embodiments, the controller 210 can be a computing device.

Further, in some alternative embodiments, the control system 200 can be a Full Authority Digital Engine and Propeller Control (FADEPC) system operable to provide full digital control of the core turbine engine 104 of the gas turbine engine 100 and the propeller 106. The controller 210 can operate as the central control unit of the FADEC system. In yet other embodiments, the one or more control devices of the control system 200 can include more than one controller for controlling the core turbine engine 104 and the propeller 106. For example, in some example embodiments, the control system 200 can include an EEC equipped with Full Authority Digital Engine Control (FADEC) and a propeller controller equipped with Full Authority Digital Propeller Control (FADPC). In such embodiments, the EEC and the propeller controller are communicatively coupled, e.g., via a suitable wired or wireless communication link.

The controller 210 depicted in the illustrated embodiment of FIG. 5 can control various aspects of the core turbine engine 104 and the propeller 106 as noted above. For instance, for this embodiment, the controller 210 includes propeller speed overshoot preventing logic 212 that, in conjunction with other features of the control system 200, reduce the propeller speed overshoot during fast acceleration or deceleration of the engine 100. The propeller speed overshoot preventing logic 212 includes propeller speed selector logic 214 (denoted as Np selector logic 214 in FIG. 5) and a motor drive 216 operable to drive a motor (e.g., a stepper motor) as will be explained below.

Moreover, the controller 210 can be communicatively coupled with various sensors. For instance, as shown in FIG. 5, the controller 210 is communicatively coupled with a sensor 220, e.g., via a wired or wireless communication link. For this embodiment, the sensor 220 is a propeller speed sensor operable to sense the speed of the propeller 106 as it rotates about its axis of rotation. The controller 210 can receive the data indicative of the propeller speed from the sensor 220. In some control schemes, the data can be routed to the propeller speed overshoot preventing logic 212 so that the engine 100 and the propeller 106 can be controlled based at least in part on the measured propeller speed.

The control system 200 also includes a fuel metering unit (FMU) 230 for metering fuel to the engine 100, e.g., from a fuel tank onboard the aerial vehicle 50 (FIG. 1). The fuel metering unit 230 is communicatively coupled with the controller 210, e.g., via a suitable wired or wireless communication link. The controller 210 can control the FMU 230 to selectively allow a volume of fuel to engine 100, e.g., based on an engine speed set point and/or other control aspects.

Further, the control system 200 includes an electric propeller governor 250. The electric propeller governor 250 can be mounted to the engine 100, e.g., within or to housing 138 (FIG. 3). Generally, the electric propeller governor 250 is operable to control or govern the speed of the propeller 106. The electric propeller governor 250 can be any suitable hydromechanical propeller governor. For instance, the electric propeller governor 250 can be a constant speed propeller governor operable to respond to a change in engine speed by directing oil under pressure to a propeller hydraulic cylinder or by releasing oil from the hydraulic cylinder, e.g., to move a piston disposed within the cylinder, to ultimately change the pitch angle of the propeller blades 150 (FIG. 2) of the propeller 106 such that the engine speed can be maintained at a set engine speed. The electric propeller governor 250 can be set to a specific speed set point (rpm) via a propeller speed selector device 240. The selector device 240 can be any suitable device operable to switch or adjust the speed of the propeller 106. For instance, the selector device 240 can be a switch located in a cockpit of the aircraft to which the engine 100 and propeller 106 are mounted. In other embodiments, the selector device 240 can be a lever or some other manually adjustable device.

Figure 6:
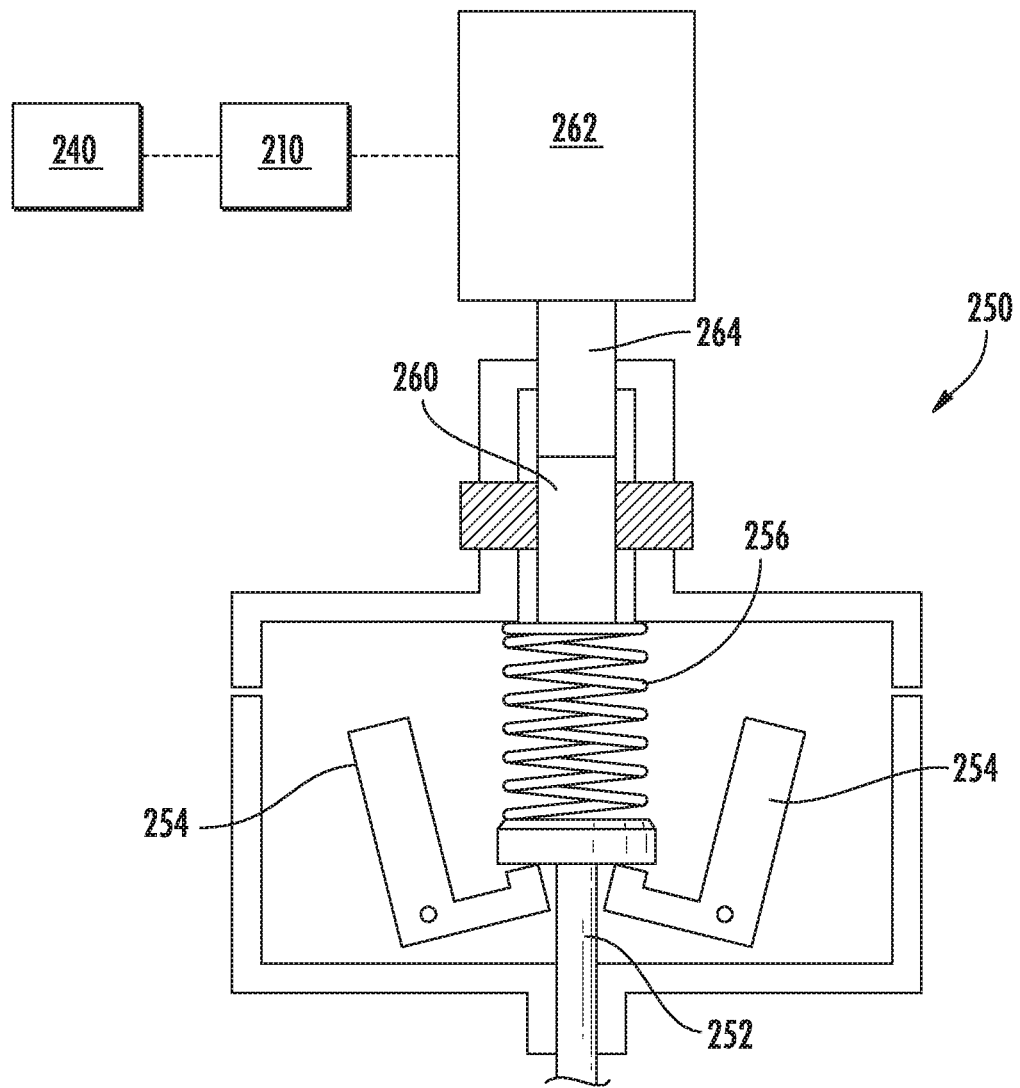
FIG. 6 provides a schematic view of an electric propeller governor of the control system of FIG. 5.

FIG. 6 provides a schematic view of the electric propeller governor 250 according to an example embodiment of the present subject matter. As depicted, the electric propeller governor 250 includes a pilot valve 252 controlled by flyweights 254 to control the flow of oil (not shown) to or from a propeller pitch control unit (not shown) of the propeller 106, which ultimately increases or decreases the propeller speed by changing the pitch of the propeller blades 150. The electric propeller governor 250 includes a flyweight governor spring 256, also referred to as a speeder spring, that is mechanically coupled with a spring adjustment mechanism 260 (e.g., a vertical adjusting worm or other suitable adjustment mechanism), which is in turn mechanically coupled with a motor as explained below. The flyweight governor spring 256 opposes the ability of the flyweights 254 to move outward from the flyweight governor spring 256. The preload (e.g., tension or compression) on the flyweight governor spring 256 can be adjusted manually by user manipulation of the selector device 240 (located within the cockpit of the aerial vehicle 50 (FIG. 1)), in response to movement of the flyweights 254 to maintain an onspeed condition, or automatically via control system 200 as will be explained herein. The preload on the flyweight governor spring 256 ultimately controls the speed of the engine 100.

Generally, the electric propeller governor 250 can operate in an onspeed condition, an overspeed condition, and an underspeed condition. When the engine 100 is operating above the engine speed set point, the electric propeller governor 250 operates in an overspeed condition. When this occurs, the flyweights 254 overcome the tension of the flyweight governor spring 256 and move outward from the flyweight governor spring 256, e.g., as shown in FIG. 6. The outward movement of the flyweights 254 moves the pilot valve 252 (e.g., vertically upward) to move oil to or from the propeller pitch control unit (not shown) so that the pitch of the blades 150 can be increased. The increased pitch of the blades 150 increases the load on the engine 100, and consequently, the engine speed decreases so that the set speed of the engine is maintained. On the other hand, when the engine 100 is operating below the engine speed set point, the electric propeller governor 250 operates in an underspeed condition. When this occurs, the flyweights 254 move or tilt inward due to the lack of centrifugal force on the flyweights 254 to overcome the force of the flyweight governor spring 256. The pilot valve 252 is moved by the flyweight governor spring 256 (e.g., vertically downward) and the pilot valve 252 meters oil flow to the propeller pitch control unit so that the pitch of the blades 150 can be decreased, which consequently raises the speed of the engine 100. Oil can be metered to and from the propeller pitch control unit until an onspeed condition is met, e.g., when the force on the flyweights 254 and the tension on the flyweight governor spring 256 are balanced, or stated alternatively, when the speed of the engine matches the engine speed set by the pilot. The balance of forces can be disturbed by the aircraft changing attitude (climb or dive), the pilot changing the tension on the flyweight governor spring 256 utilizing the selector device 240 (e.g., by user manipulation of a switch), or automatically by control system 200 if certain conditions are met during rapid acceleration or deceleration of the engine 100.

With reference now to FIGS. 5 and 6, as shown, the electric propeller governor 250 includes a motor 262 mechanically coupled with the flyweight governor spring 256. For instance, the output shaft 264 of the motor 262 can be mechanically coupled with the flyweight governor spring 256 via spring adjustment mechanism 260 as shown in FIG. 6. The motor 262 can be a stepper motor, for example. When certain conditions are met during rapid acceleration or deceleration of the engine 100, the controller 210 can cause the motor 262 of the electric propeller governor 250 to change the preload on the flyweight governor spring 256, e.g., by applying a torque on spring adjustment mechanism 260 via output shaft 264, which in turns adjusts the tension of flyweight governor spring 256. More particularly, if certain conditions are met during rapid acceleration or deceleration of the engine 100, the motor drive 216 of the controller 210 can send one or more command signals 272 (e.g., one or more pulses) to the motor 262 such that the output shaft 264 of the motor 262 is rotated the desired number of steps. In this way, the motor 262 can accurately and precisely control the preload on the flyweight governor spring 256. In other example embodiments, the motor 262 can be mechanically coupled with the flyweight governor spring 256 in other example manners. Further, the selector device 240 can be communicatively coupled (e.g., electrically connected) with the motor 262. For instance, as shown best in FIG. 5, the selector device 240 can be directly electrically connected with the propeller speed selector logic 214 of controller 210, which is electrically connected with and controls the motor drive 216, which in turn is electrically connected with and controls the motor 262. In this way, a pilot can manipulate the selector device 240 within the cockpit, and in turn, the motor 262 can turn its output shaft 264 to ultimately change the preload on the flyweight governor spring 256. Thus, the pilot can use the selector device 240 to change or adjust the propeller speed via selector device 240. In yet other embodiments, the selector device 240 can be mechanically coupled (e.g., one or more linkages) to spring adjustment mechanism 260, and in such embodiments, manual manipulation of selector device 240 (e.g., a lever) can cause adjustment of the preload on flyweight governor spring 256.

Figures 7, 8:
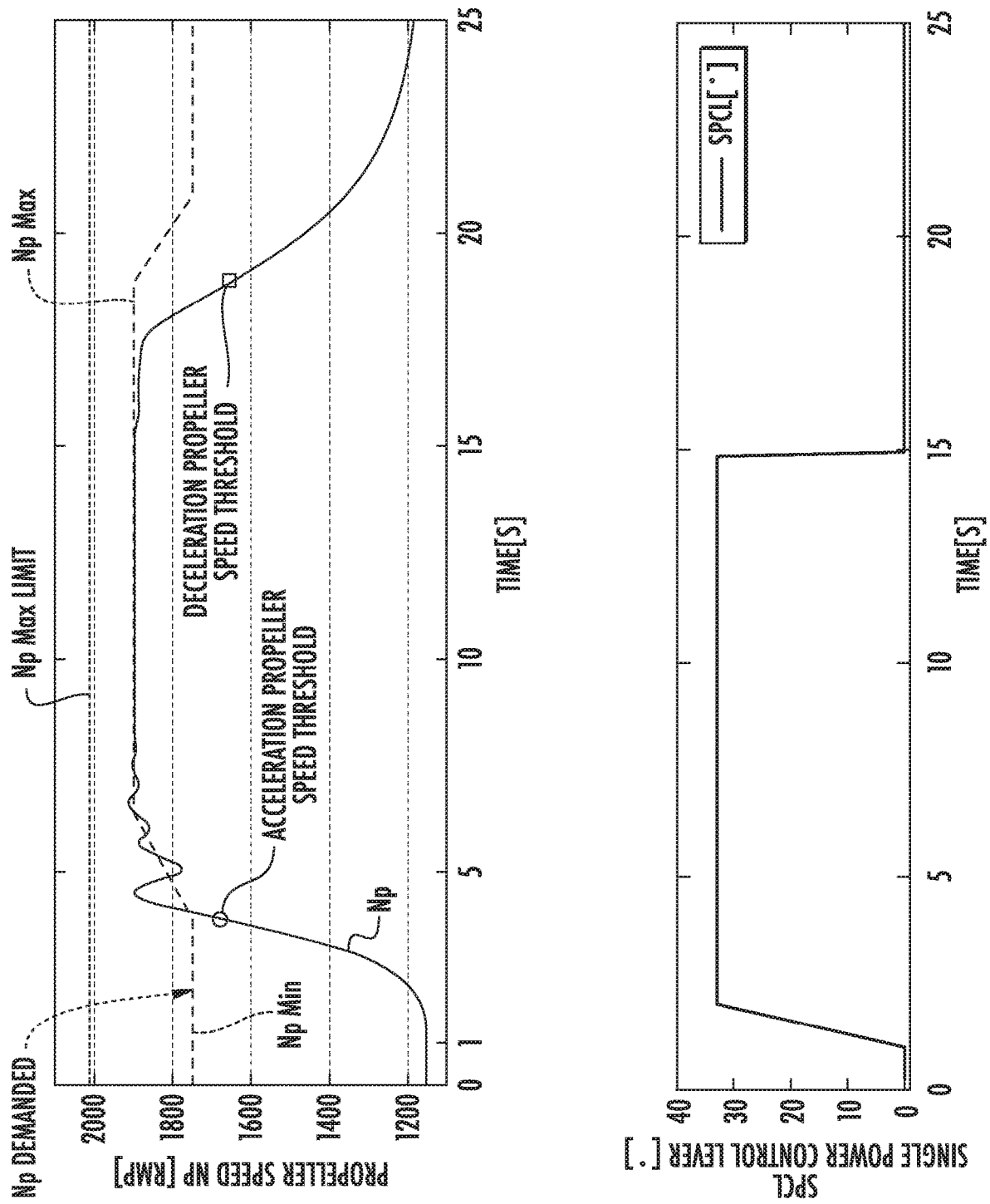
FIG. 7 provides a graph depicting propeller speed of a propeller operatively coupled with an engine versus time.
FIG. 8 provides a graph that corresponds with the graph of FIG. 7 and depicts an angle of a single power control lever versus time.

With reference now to FIGS. 5, 7, and 8, an example manner in which the control system 200 can reduce or prevent propeller speed overshoot is provided. FIG. 7 provides a graph depicting propeller speed of the propeller 106 operatively coupled with the engine 100 versus time and FIG. 8 provides a graph that corresponds with the graph of FIG. 7 and depicts the angle of a single power control lever (SPCL), which is representative of the demanded engine power, versus time.

During operation of the engine 100, or more particularly the engine 100 and propeller 106 operatively coupled thereto, the controller 210 receives data 270 (FIG. 5) indicative of the propeller speed (denoted as "Np" in FIG. 5) of the propeller 106. The controller 210 can receive the data 270 from the sensor 220 communicatively coupled thereto, e.g., via a wired or wireless communication link. The controller 210 can continuously receive data 270 during operation of the engine 100 or can receive data 270 at predetermined intervals, e.g., every ten milliseconds (10 ms). In this way, the speed of the propeller 106 can continuously or nearly continuously be monitored during operation of the engine 100. Once the controller 210 receives the data 270 indicative of the propeller speed of the propeller 106, the controller 210 is configured to determine whether the measured propeller speed exceeds a propeller speed threshold.

For instance, when the SPCL (FIG. 5) is moved from an angle of zero degrees (0°) to an angle of about thirty-three degrees (33°) as shown in FIG. 8, the engine 100 (FIG. 5) accelerates rapidly from idle to full power, and consequently, the propeller speed of the propeller 106 rapidly accelerates as well as shown in FIG. 7. Particularly, as depicted in FIG. 7, the propeller speed Np of the propeller 106 accelerates from under 1,200 rpm to about 1,900 rpm in about five seconds (5 s). For this embodiment, the propeller speed threshold is set at 1,675 rpm as shown in FIG. 7. As the propeller speed is accelerating (i.e., increasing in speed over time), the propeller speed threshold is an acceleration propeller speed threshold. The propeller speed overshoot preventing logic 212 of the controller 210 can determine whether the measured propeller speed (as determined from the data 270) exceeds the propeller speed threshold. As shown in FIG. 7, for this embodiment, the propeller speed Np of the propeller 106 exceeds the acceleration propeller speed threshold of 1,675 rpm at about four seconds (4 s).

As depicted in FIG. 7, the propeller can be set at different propeller speed set points, e.g., a first set point and a second set point. The set point of the propeller speed corresponds to a demanded propeller speed (Np demanded). The first set point can correspond to a minimum propeller speed demanded (Np Min) and the second set point can correspond to a maximum propeller speed demanded (Np Max). In some embodiments, the propeller speed set point of the propeller 106 is only switchable between a first set point and a second set point. For instance, for this embodiment, the propeller speed set point of the propeller 106 is only switchable between a minimum propeller speed demanded (Np Min) and a maximum propeller speed demanded (Np Max). Stated differently, the pilot can demand either a minimum propeller speed (Np Min) or a maximum propeller speed (Np Max).

Notably, the controller 210 is configured to adjust the propeller speed set point to change the propeller speed of the propeller based at least in part on whether the propeller speed exceeds the propeller speed threshold. For instance, if the propeller speed exceeds the propeller speed threshold, e.g., as shown in FIG. 7 at about four seconds (4 s), then the propeller speed set point (i.e., Np demanded) is adjusted from Np Min to Np Max. For instance, as depicted in FIG. 7, when the propeller speed exceeds the acceleration propeller speed threshold of 1,675 rpm, the propeller speed selector logic 214 of the propeller speed overshoot preventing logic 212 adjusts the propeller speed set point from Np Min to Np Max.

For this embodiment, to adjust the propeller speed set point, the controller 210 causes the motor 262 of the electric propeller governor 250 to change the preload on the flyweight governor spring 256 based at least in part on whether the propeller speed exceeds the acceleration propeller speed threshold. That is, the controller 210 causes the motor 262 of the electric propeller governor 250 to change the preload on the flyweight governor spring 256 if the measured propeller speed exceeds the acceleration propeller speed threshold. For instance, the motor drive 216 of the controller 210 can cause the stepper motor 262 to change the preload on the flyweight governor spring 256 if the propeller speed exceeds the propeller speed threshold. The motor drive 216 can command the motor 262 such that the motor 262 gradually or linearly changes the preload on the flyweight spring 256 at predefined rate of set point change, e.g., as shown in FIG. 7. In FIG. 7, the motor drive 216 commands the motor 262 to gradually change the preload on the flyweight spring 256 over the course of about two and a half seconds from four seconds (4 s) to about six and on a half seconds (6.5 s). The gradual or linear change of the preload on the flyweight governor spring 256 prevents vibration and jarring of the components of the propeller 106 and engine 100 during engine acceleration. The drive motor 216 can cause the motor 262 to drive its output shaft 264 (FIG. 6) such that the output shaft 264 applies a torque on the spring adjustment mechanism 260 (FIG. 6), which in turn can adjust the tension or preload on the flyweight governor spring 256.

Notably, changing the preload on the flyweight governor spring 256 adjusts the propeller speed set point of the propeller 106, or in this embodiment, the preload of the flyweight governor spring 256 adjusts the propeller speed set point of the propeller 106 from Np Min to Np Max as shown in FIG. 7. By adjusting the propeller speed set point during fast acceleration as described above, advantageously, the propeller speed is prevented from overshooting the demanded propeller speed, or Np Max in this example. Rather, as depicted in FIG. 7, the propeller speed reaches the demanded propeller speed or Np Max (1,900 rpm in this example) and then stabilizes after several seconds. The propeller speed does not overshoot Np Max and consequently does not reach at or near the propeller speed maximum limit, or Np Max Limit. Accordingly, as shown, the control system 200 prevents the propeller speed from overshooting Np Max and thus the engine 100 and/or propeller 106 are not impacted by the drawbacks associated with overshooting the maximum demanded propeller speed and prevents the propeller speed from reaching at or near the propeller speed maximum limit (Np Max Limit), e.g., as shown by Np2 in FIG. 4 that is controlled by a conventional control system.

As further shown in FIG. 7, the propeller speed threshold can also correspond to a deceleration propeller speed threshold if the propeller speed is decelerating (i.e., decreasing in speed over time). For instance, when the SPCL (FIG. 5) is moved from an angle of about thirty-three degrees (33°) to an angle of zero degrees (0°) as shown in FIG. 8 at about fifteen seconds (15 s), the engine 100 (FIG. 5) decelerates rapidly from full power to idle power, and consequently, the propeller speed of the propeller 106 rapidly decelerates as well as shown in FIG. 7. Particularly, as depicted in FIG. 7, the propeller speed of the propeller 106 decelerates from about 1,900 rpm to under 1,200 rpm in about ten seconds (10 s). For this embodiment, the deceleration propeller speed threshold is set at 1,650 rpm as shown in FIG. 7. The propeller speed overshoot preventing logic 212 of the controller 210 can determine whether the measured propeller speed (as determined from the data 270) exceeds the deceleration propeller speed threshold. As shown in FIG. 7, for this embodiment, the propeller speed of the propeller 106 exceeds the deceleration propeller speed threshold of 1,650 rpm at about nineteen seconds (19 s).

The controller 210 is configured to adjust the propeller speed set point to change the propeller speed of the propeller based at least in part on whether the propeller speed exceeds the propeller speed threshold. For instance, if the propeller speed exceeds the deceleration propeller speed threshold, e.g., as shown in FIG. 7 at about nineteen seconds (19 s), then the propeller speed set point (i.e., the demanded propeller speed) is adjusted from Np Max to Np Min. As depicted in FIG. 7, when the propeller speed exceeds the deceleration propeller speed threshold of 1,650 rpm, the propeller speed selector logic 214 adjusts the propeller speed set point from Np Max to Np Min.

For this embodiment, to adjust the propeller speed set point, the controller 210 causes the motor 262 of the electric propeller governor 250 to change the preload on the flyweight governor spring 256 based at least in part on whether the propeller speed exceeds the deceleration propeller speed threshold. That is, the controller 210 causes the motor 262 of the electric propeller governor 250 to change the preload on the flyweight governor spring 256 if the measured propeller speed exceeds the deceleration propeller speed threshold. For instance, the motor drive 216 of the controller 210 can cause the stepper motor 262 to change the preload on the flyweight governor spring 256 if the propeller speed exceeds the deceleration propeller speed threshold. The motor drive 216 can command the motor 262 such that the motor 262 gradually or linearly changes the preload on the flyweight spring 256, e.g., as shown in FIG. 7. In FIG. 7, the motor drive 216 commands the motor 262 to gradually or linearly change the preload on the flyweight spring 256 over a predetermined time, or over the course of about two seconds from nineteen seconds (19 s) to about twenty-one seconds (21 s) in this example. The drive motor 216 can cause the motor 262 to drive its output shaft 264 (FIG. 6) such that the output shaft 264 applies a torque on the spring adjustment mechanism 260 (FIG. 6), which in turn can adjust the tension or preload on the flyweight governor spring 256. Changing the preload on the flyweight governor spring 256 adjusts the propeller speed set point of the propeller 106, or in this embodiment, the preload on the flyweight governor spring 256 adjusts the propeller speed set point of the propeller 106 from Np Max to Np Min as shown in FIG. 7.

As shown best in FIG. 7, the deceleration propeller speed threshold can be offset from the acceleration propeller speed threshold. Particularly, for this embodiment, the acceleration threshold (1,675 rpm) and the deceleration (1,650 rpm) threshold are offset by 25 rpm. In this manner, hysteresis is utilized to prevent undesired switching between Np Max and Np Min, e.g., caused by tolerances and control accuracies. For this embodiment, the acceleration propeller speed threshold is set at a higher rpm than the deceleration propeller speed threshold.

Further, in some embodiments, in addition to the propeller speed exceeding either the accelerating or decelerating propeller speed threshold, the speed of the propeller must also be accelerating or decelerating at a predetermined rate in order for the control system 200 to switch the propeller speed set point, e.g., from Np Min to Np Max or vice versa. For instance, in some embodiments, the controller 210 is configured to determine whether the propeller speed is changing at a predetermined rate (i.e., whether the propeller speed is accelerating or decelerating at a predetermined rate) based at least in part on the received data indicative of the propeller speed of the propeller. In such embodiments, if the propeller speed is changing at the predetermined rate and the propeller speed exceeds the propeller speed threshold, then the controller 210 is configured to automatically cause the motor 262 of the electric propeller governor 250 to change the preload on the flyweight governor spring 256. As a result, the controller 210 automatically changes the propeller speed set point (e.g., from Np Min to Np Max or from Np Max to Np Min).

The predetermined rate can correspond to an acceleration predetermined rate or a deceleration predetermined rate depending on whether the propeller speed is increasing or decreasing. For instance, the acceleration predetermined rate can be set to correspond with acceleration of the propeller speed during takeoff of the vehicle 50 (FIG. 1) as shown in FIG. 7. For example, the acceleration predetermined rate can correspond to a rate of 600 rpm over a period of eight seconds (8 s). Thus, if the propeller speed increases by or more than 600 rpm over a period of eight seconds (8 s), as it does in FIG. 7, the controller 210 can determine that the propeller speed exceeds the acceleration propeller speed threshold and is accelerating at the predetermined rate, and accordingly, the controller 210 can automatically cause adjustment of the propeller speed set point, e.g., from Np Min to Np Max. Further, in some embodiments, the deceleration predetermined rate can be set to correspond with deceleration of the propeller speed during a power down of the engine 100 as shown in FIG. 7. For instance, the deceleration predetermined rate can correspond to a rate of 400 rpm over a period of ten seconds (10 s), for example. Thus, if the propeller speed decreases by or more than 400 rpm over a period of ten seconds (10 s), as it does in FIG. 7, the controller 210 can determine that the propeller speed exceeds the deceleration propeller speed threshold and is decelerating at the deceleration predetermined rate, and accordingly, the controller 210 can automatically cause adjustment of the propeller speed set point, e.g., from Np Max to Np Min.

Figure 9:
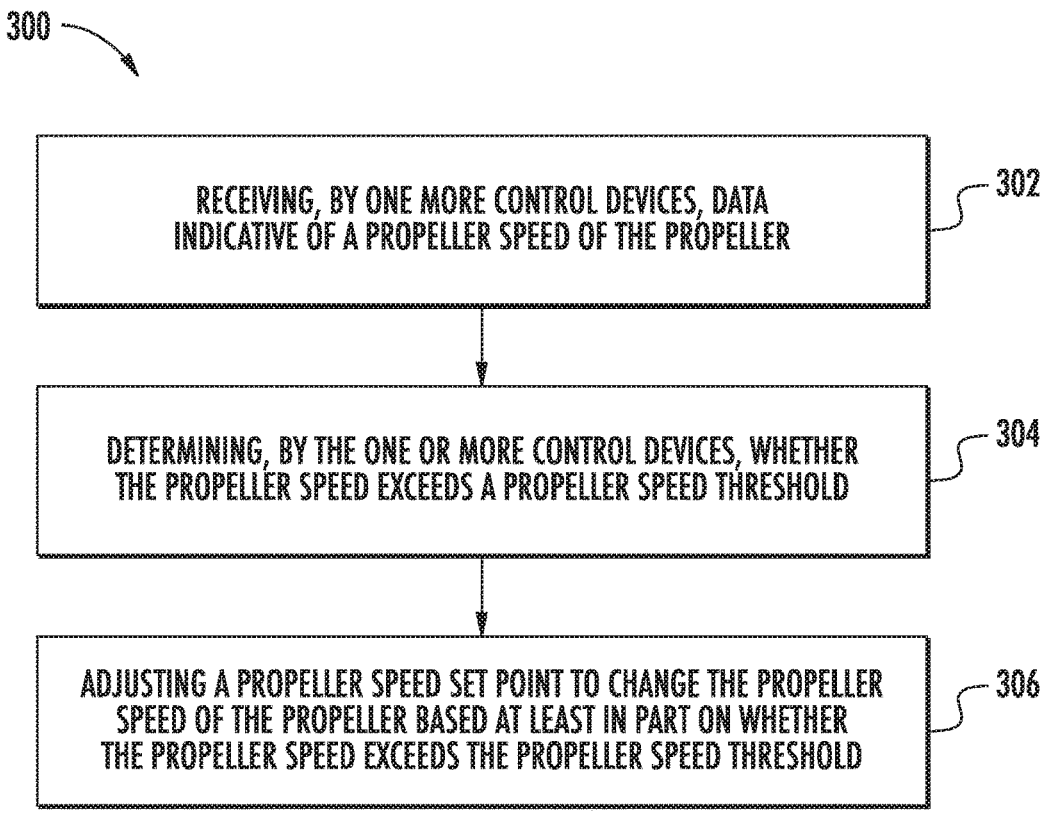
FIG. 9 provides a flow diagram of an example method according to an example embodiment of the present subject matter.

FIG. 9 provides a flow diagram of an example method (300) for controlling an engine operatively coupled with a propeller. For instance, the method (300) can be implemented to control the engine 100 and/or propeller 106 of the vehicle 50 of FIG. 1. However, the method (300) can be implemented to control other engines operatively coupled with a propeller. Some or all of the method (300) can be implemented by control system 200 disclosed herein. In addition, it will be appreciated that exemplary method (300) can be modified, adapted, expanded, rearranged and/or omitted in various ways without deviating from the scope of the present subject matter.

At (302), the method (300) includes receiving, by one or more computing devices, data indicative of a propeller speed of the propeller. For instance, with reference to FIG. 5, the controller 210 of the control system 200 can receive data 270 indicative of the speed of the propeller 106 from the sensor 220. In some implementations, the controller 210 can receive data 270 continuously during operation of the engine 100 and propeller 106. The data 270 can be routed from sensor 220 to controller 210 the any suitable wired and/or wireless communication link. The data 270 can be analog and/or digital signals. The data 270 indicative of the speed of the propeller 106 can be utilized by controller 210 to control the propeller speed set point of the propeller 106 and can also be used to determine the acceleration or deceleration of the propeller 106.

At (304), the method (300) includes determining, by the one or more computing devices, whether the propeller speed exceeds a propeller speed threshold. For instance, with reference to FIG. 5, once the controller 210 receives the data 270 indicative of the propeller speed of the propeller 106, the controller 210 can determine whether the propeller speed exceeds a propeller speed threshold. In some implementations, the method (300) further includes determining, by the one or more computing devices, whether the propeller speed of the propeller is increasing or decreasing based at least in part on the received data indicative of the propeller speed of the propeller. In such implementations, if the propeller speed of the propeller is increasing over time (i.e., the propeller is accelerating), then the propeller speed threshold is an acceleration propeller speed threshold. Accordingly, the controller 210 determines whether the measured speed of the propeller 106 exceeds the acceleration propeller speed threshold. That is, the controller 210 determines whether the measured propeller speed is greater than the acceleration propeller speed threshold. For example, if the acceleration propeller speed threshold is set at 1,675 rpm (e.g., as shown in FIG. 7), the controller 210 determines whether the measured propeller speed is greater than 1,675 rpm.

If, on the other hand, the propeller speed of the propeller is decreasing over time (i.e., the propeller is decelerating), then the propeller speed threshold is a deceleration propeller speed threshold. Accordingly, the controller 210 determines whether the measured speed of the propeller 106 exceeds the deceleration propeller speed threshold. That is, the controller 210 determines whether the measured propeller speed is less than the deceleration propeller speed threshold. For example, if the deceleration propeller speed threshold is set at 1,650 rpm (e.g., as shown in FIG. 7), the controller 210 determines whether the measured propeller speed is less than 1,650 rpm. Notably, in some implementations, the deceleration propeller speed threshold and the acceleration propeller speed threshold are offset from one another. In this way, inadvertent or undesirable switching between propeller speed set points is prevented.

At (306), the method (300) includes adjusting a propeller speed set point to change the propeller speed of the propeller based at least in part on whether the propeller speed exceeds the propeller speed threshold. For instance, if the measured propeller speed exceeds the propeller speed threshold as determined at (304), then at (306) the propeller speed set point can be adjusted. In some implementations, the propeller speed set point is automatically adjusted to adjust propeller speed of the propeller if the propeller speed exceeds a propeller speed threshold.

In some implementations, the propeller speed set point is adjustable between a maximum set point (Np Max) and a minimum set point (Np Min). In some implementations, the propeller speed set point is adjustable only between the maximum set point (Np Max) and the minimum set point (Np Min). In such implementations, if the propeller speed of the propeller is increasing and the propeller speed of the propeller exceeds the acceleration propeller speed threshold, then the propeller speed set point is adjusted from the minimum set point (Np Min) to the maximum set point (Np Max). For example, with reference to FIG. 7, the propeller speed is shown rapidly increasing from about one and a half seconds (1.5 s) to about four and a half seconds (4.5 s), and as depicted, the propeller speed exceeds the acceleration propeller speed threshold of 1,675 rpm at about four seconds (4 s). Accordingly, the propeller speed set point or demanded propeller speed is adjusted from the minimum set point (Np Min) to the maximum set point (Np Max). The control system 200 can automatically switch or adjust the propeller speed set point when the propeller speed exceeds the acceleration propeller speed set point. By adjusting the propeller speed set point from Np Min to Np Max during fast acceleration of the engine 100 and propeller 106, the propeller speed is prevented from overshooting the demanded propeller speed (Np Max) and does not reach or obtain the maximum propeller speed limit (Np Max Limit); thus, the propeller 106 and engine 100 are not subject to the negative impacts associated with propeller speed overshoot.

If, on the other hand, the propeller speed of the propeller is decreasing and the propeller speed of the propeller exceeds the deceleration propeller speed threshold, then the propeller speed set point is adjusted from the maximum set point (Np Max) to the minimum set point (Np Min). For example, with reference to FIG. 7, the propeller speed is shown rapidly decreasing at about fifteen seconds (15 s). As depicted, the propeller speed exceeds the deceleration propeller speed threshold of 1,650 rpm at about nineteen seconds (19 s). Thus, the propeller speed set point or demanded propeller speed is adjusted from the maximum set point (Np Max) to the minimum set point (Np Min). Notably, the control system 200 can automatically switch or adjust the propeller speed set point when the propeller speed exceeds the deceleration propeller speed set point.

In some implementations, adjusting the propeller speed set point based at least in part on whether the propeller speed exceeds the propeller speed threshold at (306) includes causing, by the one or more computing devices, a motor mechanically coupled with a flyweight governor spring of an electric propeller governor to change a preload on the flyweight governor spring. For instance, with reference to FIGS. 5 and 6, once the controller 210 determines that the measured propeller speed exceeds the propeller speed threshold at (304), the motor drive 216 of the controller 210 can command or pulse the motor 262. When the motor 262 is pulsed, the output shaft 264 of the motor 262 is rotated or otherwise move about its axis of rotation, which applies a torque on the spring adjustment mechanism 260. When the torque is applied on the spring adjustment mechanism 260, the preload on the flyweight governor spring 256 is changed. That is, the spring adjustment mechanism 260 changes the tension on the flyweight governor spring 256. The adjustment of the preload on the flyweight governor spring 256 adjusts the propeller speed set point, e.g., from Np Min to Np Max or vice versa depending on whether the propeller speed is accelerating or decelerating.

In some further implementations, causing, by the one or more computing devices, the motor mechanically coupled with the flyweight governor spring of the electric propeller governor to change the preload on the flyweight governor spring includes commanding, by a motor drive of the one or more computing devices communicatively coupled with the motor, the motor to change the preload on the flyweight governor spring such that the propeller speed set point linearly changes from a first set point to a second set point (e.g., from Np Min to Np Max or vice versa). For instance, as shown in FIG. 7, when the propeller speed exceeds the acceleration propeller speed threshold at about four seconds (4 s), the motor drive 216 (FIG. 5) commands the motor 262 (FIG. 5) to change the preload on the flyweight governor spring 256 (FIG. 5) such that the propeller speed set point linearly changes from Np Min to Np Max. This gradual or linear change smooths or eases the propeller into the higher demanded speed, or Np Max. As further depicted in FIG. 7, when the propeller speed exceeds the deceleration propeller speed threshold at about nineteen seconds (19 s), the motor drive 216 (FIG. 5) commands the motor 262 (FIG. 5) to change the preload on the flyweight governor spring 256 (FIG. 5) such that the propeller speed set point linearly changes from Np Max to Np Min. This gradual or linear change smooths or eases the propeller into the lower demanded speed, or Np Min and prevents jarring of the engine 100 and the propeller 106 operatively coupled thereto.

Figure 10:
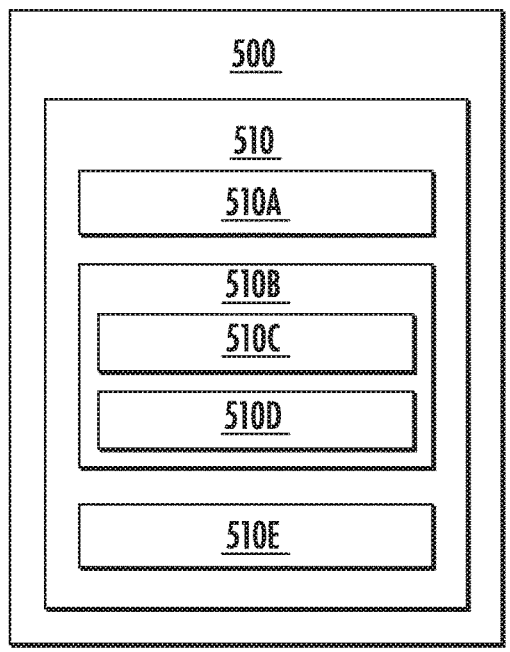
FIG. 10 provides an example computing system according to example embodiments of the present subject matter.

FIG. 10 provides an example computing system 500 according to example embodiments of the present subject matter. The computing system 500 can include one or more computing device(s) 510. For instance, one of the computing device(s) 510 can be the controller 210 described herein. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, such as e.g., operations for controlling the engine 100 (FIG. 1) and/or propeller 106 (FIG. 1) as described herein. Thus, the method (300) can be implemented at least in part by the one or more computing device(s) 510 of the computing system 500. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include data indicative of the various propeller speed thresholds, among other potential items or settings described herein.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external devices, such as an external remote control, can be configured to receive one or more commands from the computing device(s) 510 or provide one or more commands to the computing device(s) 510.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control system for an engine operatively coupled with a propeller, the control system comprising:
an electric propeller governor having a motor and a flyweight governor spring mechanically coupled with the motor;
a sensor operable to sense a propeller speed of the propeller;
one or more control devices communicatively coupled with the motor of the propeller governor and the sensor, the one more control devices configured to:
receive, from the sensor, data indicative of the propeller speed of the propeller;
receive a commanded power level;
energize the motor of the electric propeller governor to provide a first preload on the flyweight governor spring as a result of receiving a commanded power level;
determine whether the propeller speed exceeds a propeller speed threshold, the propeller speed threshold being different than a propeller speed set point; and
as a result of the propeller speed exceeding a propeller speed threshold, energize the motor of the electric propeller governor to change a preload on the flyweight governor spring from the first preload to a second preload, the first preload corresponding to a first set point of the propeller speed set point and the second preload corresponding to a second set point of the propeller speed set point, wherein the second set point corresponds to the commanded power level.

2. The control system of claim 1, wherein the engine is a gas turbine engine mounted to a vehicle.

3. The control system of claim 2, wherein if the propeller speed is increasing at a predetermined rate, then the propeller speed threshold is an acceleration propeller speed threshold, and wherein if the propeller speed of the propeller is decreasing at the predetermined rate, then the propeller speed threshold is a deceleration propeller speed threshold, and wherein the deceleration propeller speed threshold and the acceleration propeller speed threshold are offset from one another.

4. The control system of claim 1, wherein the propeller speed set point of the propeller is only switchable between the first set point and the second set point.

5. The control system of claim 1, wherein the one or more control devices have a motor drive operable to cause the motor to linearly change the preload on the flyweight governor spring at a predefined rate from the first preload to the second preload if the propeller speed exceeds the propeller speed threshold.

6. The control system of claim 1, wherein the engine is a turboprop.

7. A method for controlling an engine operatively coupled with a propeller, the method comprising:
receiving, by one or more control devices, data indicative of a propeller speed of the propeller;
receiving a commanded power level;
energize a motor of an electric propeller governor to provide a first preload on a flyweight governor spring as a result of receiving a commanded power level;
determining, by the one or more control devices, whether the propeller speed exceeds a propeller speed threshold, the propeller speed threshold being different than a propeller speed set point; and
as a result of the propeller speed exceeding a propeller speed threshold, adjusting the propeller speed set point from a first set point to a second set point to change the propeller speed of the propeller;
wherein adjusting the propeller speed set point based on whether the propeller speed exceeds the propeller speed threshold comprises energizing, by the one or more control devices, the motor mechanically coupled with the flyweight governor spring of the electric propeller governor to change a preload on the flyweight governor spring from the first preload to a second preload, wherein the second preload corresponds to the second set point, and wherein the second set point corresponds to the commanded power level.

8. The method of claim 7, wherein causing, by the one or more control devices, the motor mechanically coupled with the flyweight governor spring of the electric propeller governor to change the preload on the flyweight governor spring comprises commanding, by a motor drive of the one or more control devices communicatively coupled with the motor, the motor to change the preload on the flyweight governor spring such that the propeller speed set point linearly changes with a predefined rate of set point change from the first set point to the second set point.

9. The method of claim 7, further comprising:
determining, by the one or more control devices, whether the propeller speed of the propeller is increasing or decreasing based at least in part on the received data indicative of the propeller speed of the propeller, and
wherein if the propeller speed of the propeller is increasing, then the propeller speed threshold is an acceleration propeller speed threshold, and wherein if the propeller speed of the propeller is decreasing, then the propeller speed threshold is a deceleration propeller speed threshold, and wherein the deceleration propeller speed threshold and the acceleration propeller speed threshold are offset from one another.

10. The method of claim 9, wherein the first set point corresponds to a minimum set point and the second set point corresponds to a maximum set point, and wherein if the propeller speed of the propeller is increasing and the propeller speed of the propeller exceeds the acceleration propeller speed threshold, then the propeller speed point is adjusted from the minimum set point to the maximum set point.

11. The method of claim 10, wherein the propeller speed set point is adjustable only between the maximum set point and the minimum set point.

12. The method of claim 7, wherein the propeller speed set point is automatically adjusted to adjust the propeller speed of the propeller if the propeller speed exceeds the propeller speed threshold.

13. A vehicle comprising:
a gas turbine engine;
a propeller operatively coupled with the gas turbine engine;
an electric propeller governor having a motor and a flyweight governor spring mechanically coupled with the motor;
a control system, comprising:
a sensor;
a controller communicatively coupled with the sensor, the controller configured to:
receive, from the sensor, data indicative of a propeller speed of the propeller;

receive a commanded power level;
energize the motor of the electric propeller governor to provide a first preload on the flyweight governor spring as a result of receiving a commanded power level:
determine whether the propeller speed exceeds a propeller speed threshold, the propeller speed threshold being different than a propeller speed set point; and
as a result of the propeller speed exceeding a propeller speed threshold, cause adjustment of the propeller speed set point from a first set point to a second set point to change the propeller speed of the propeller;
wherein in causing adjustment of the propeller speed set point to change the propeller speed of the propeller based on whether the propeller speed exceeds the propeller speed threshold, the controller is configured to energize the motor of the electric propeller governor to change a preload on the flyweight governor spring from the first preload to a second preload, wherein the second preload corresponds to the second set point, and wherein the second set point corresponds to the commanded power level.

14. The vehicle of claim 13, wherein the motor is a stepper motor, and wherein the control system further comprises:
a motor drive operable to command the stepper motor to change the preload on the flyweight governor spring such that the propeller speed set point linearly changes from the first set point to the second set point.

15. The vehicle of claim 13, wherein the controller is further configured to:
determine whether the propeller speed of the propeller is increasing or decreasing based at least in part on the received data indicative of the propeller speed of the propeller, and
wherein if the propeller speed of the propeller is increasing, then the propeller speed threshold is an acceleration propeller speed threshold, and wherein if the propeller speed of the propeller is decreasing, then the propeller speed threshold is a deceleration propeller speed threshold, and wherein the deceleration propeller speed threshold and the acceleration propeller speed threshold are offset from one another.

16. The vehicle of claim 15, wherein the vehicle is an aerial vehicle.

17. The vehicle of claim 15, wherein the propeller speed set point is adjustable between a maximum set point and a minimum set point, and wherein if the propeller speed of the propeller is decreasing at a predetermined rate and the propeller speed of the propeller exceeds the deceleration propeller speed threshold, then the propeller speed point is adjusted from the maximum set point to the minimum set point.

* * * * *